(No Model.)
G. LAUBE.
VEHICLE WHEEL.
No. 532,076. Patented Jan. 8, 1895.
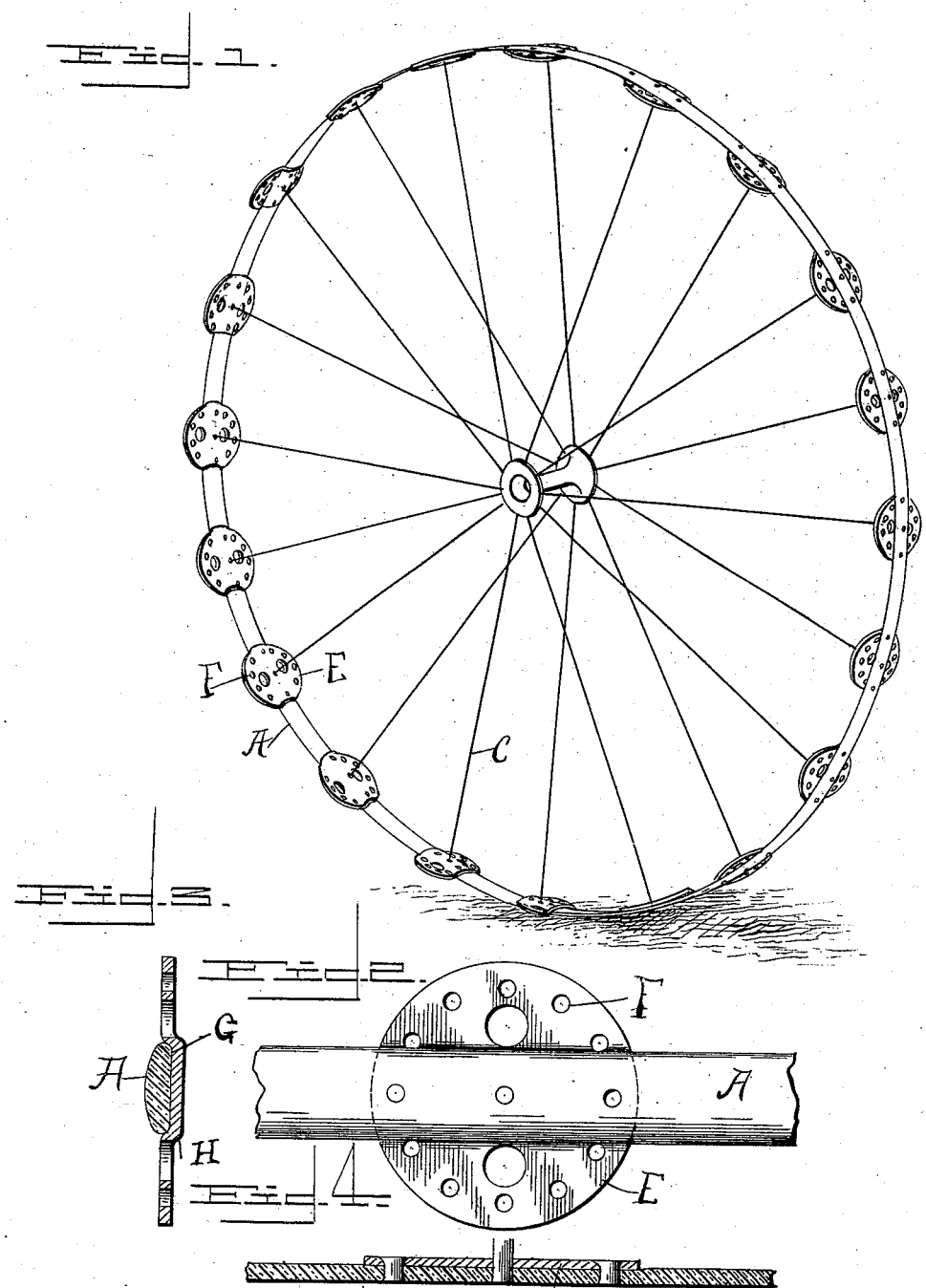
Witnesses
J. C. Gaither, Jr.
C. L. Reese
Inventor
Godfried Laube
by Evert & Appleman
Attorneys

UNITED STATES PATENT OFFICE.

GODFRIED LAUBE, OF HURON, SOUTH DAKOTA, ASSIGNOR OF ONE-HALF TO JOSEPH HYMANS, OF DEL RIO, TEXAS.

VEHICLE-WHEEL.

SPECIFICATION forming part of Letters Patent No. 532,076, dated January 8, 1895.

Application filed March 28, 1894. Serial No. 505,512. (No model.)

*To all whom it may concern:*

Be it known that I, GODFRIED LAUBE, a citizen of the United States of America, residing at Huron, in the county of Beadle and State of South Dakota, have invented certain new and useful Improvements in Vehicle-Wheels, of which the following is a specification, reference being had to the accompanying drawings.

This invention relates to certain new and useful improvements in vehicle wheels and more particularly to guards attached to the felly of the wheel. The guards are particularly adapted and designed to be applied to light vehicles, such as baby carriages.

This invention has for its object to provide novel and inexpensive means whereby vehicle wheels may be protected from the many accidents occurring by reason of the irregularities and crevices in the path of travel; a still further object being, to construct a safety guard that will be strong, durable and add but little weight to the wheel. Furthermore the invention contemplates to design a guard as heretofore mentioned that will be ornamental and attractive.

With the above objects in view, the invention finally consists in the novel construction, combination and arrangement of parts to be hereinafter more particularly described and specifically pointed out in the claims.

In describing the invention in detail, reference is had to the accompanying drawings, forming a part of this specification, and wherein like letters of reference indicate similar parts throughout the different views, in which—

Figure 1. is a view in perspective showing my invention applied to the wheel. Fig. 2. is a detail view of the section of the felly with the guard applied, and Fig. 3. is a view in section showing a modified form of attachment wherein the felly is embedded in the guard. Fig. 4 is a cross section of Fig. 2.

In the drawings—A— represents the felly; C, the spokes; D, the hub; E, the guard having apertures, F.

The guard E is provided with a groove G to receive the felly and is formed in accordance therewith. The groove G, forms a flange H, on the underneath side of the guard. The guards are applied to the inside of the felly, and may be secured in any suitable manner. They are preferably set apart equidistantly and may be secured at a point where the spokes enter the felly, or set between the spokes as desired. The guard plates may be made of any suitable material and can be made solid or perforated, and the general design may be either round or oval with the edges either plain or scalloped, but the construction as shown is preferred. The guard plates are stamped out to conform to the inside of the felly, and are set in such a manner so as to not come in contact with the ground unless the wheel rides over a depression when the guards are brought into play. The guards are perforated in order to render the attachment as light as possible, and are set close together in order to take up the sudden jar when the tire enters a slot or depression on its path of travel.

From the above description it will be apparent that various changes may be made in the details of construction of the guard plates without departing from the general idea involved.

Having fully described my invention, what I claim as new, and desire to secure by Letters Patent, is—

1. In a vehicle wheel provided with guards secured to the inside of the felly at equidistance apart, said guards having a groove adapted to embrace the felly, substantially as described and for the purpose set forth.

2. A vehicle wheel having guard plates set on the inside of the felly, the faces of said plates projecting on the side of the felly substantially as described.

3. In a vehicle wheel, the combination of the perforated guard plates, set at equidistance apart on the inside of the felly, the faces of said plates projecting on each side of the felly, substantially as specified.

4. In a vehicle wheel substantially as specified carrying oval shaped perforated guards having a central groove adapted to receive the underneath side of the felly and suitable means for securing the same, as described.

In testimony whereof I affix my signature in presence of two witnesses.

GODFRIED LAUBE.

Witnesses:
ANNIE T. LAUBE,
HATTIE ROSE LAUBE.